(12) United States Patent
Johnson

(10) Patent No.: US 7,278,319 B2
(45) Date of Patent: Oct. 9, 2007

(54) PRESSURE AND TEMPERATURE SENSING ELEMENT

(75) Inventor: Russell L. Johnson, New Brighton, MN (US)

(73) Assignee: Honeywell International Inc., Morristown, NJ (US)

( * ) Notice: Subject to any disclaimer, the term of this patent is extended or adjusted under 35 U.S.C. 154(b) by 2 days.

(21) Appl. No.: 11/271,701

(22) Filed: Nov. 10, 2005

(65) Prior Publication Data

US 2007/0113665 A1    May 24, 2007

(51) Int. Cl.
*G01L 9/06* (2006.01)
(52) U.S. Cl. .......................................... 73/721; 73/727
(58) Field of Classification Search .............. 73/179, 73/384, 721, 727; 437/901
See application file for complete search history.

(56) References Cited

U.S. PATENT DOCUMENTS

| 4,399,707 A | 8/1983 | Wamstad ..................... 727/73 |
| 4,539,843 A * | 9/1985 | Wise ........................... 73/179 |
| 6,065,346 A | 5/2000 | Voegele ....................... 754/73 |
| 6,510,742 B1 | 1/2003 | Johnson ...................... 754/73 |

* cited by examiner

*Primary Examiner*—Andre J. Allen

(57) ABSTRACT

A pressure and sensing element is provided that includes one piezo-resistive sensing element configured as a single light implant square, and may produce outputs relating to both a pressure and temperature that has been sensed. The piezo-sensing element may operate as a piezo-resistive radial element when a constant current is conducted through the element in the radial direction with respect to the diaphragm. Conversely, the piezo-sensing element may operate as a piezo-resistive tangential element when a constant current is conducted through the element in the tangential direction to the edge of the diaphragm. A difference in the radial and tangential resistances and a corresponding difference in voltage drop are proportional to an applied pressure, while a sum of the same two resistances is a function of temperature.

24 Claims, 15 Drawing Sheets

CONFIGURATION A

CONFIGURATION B

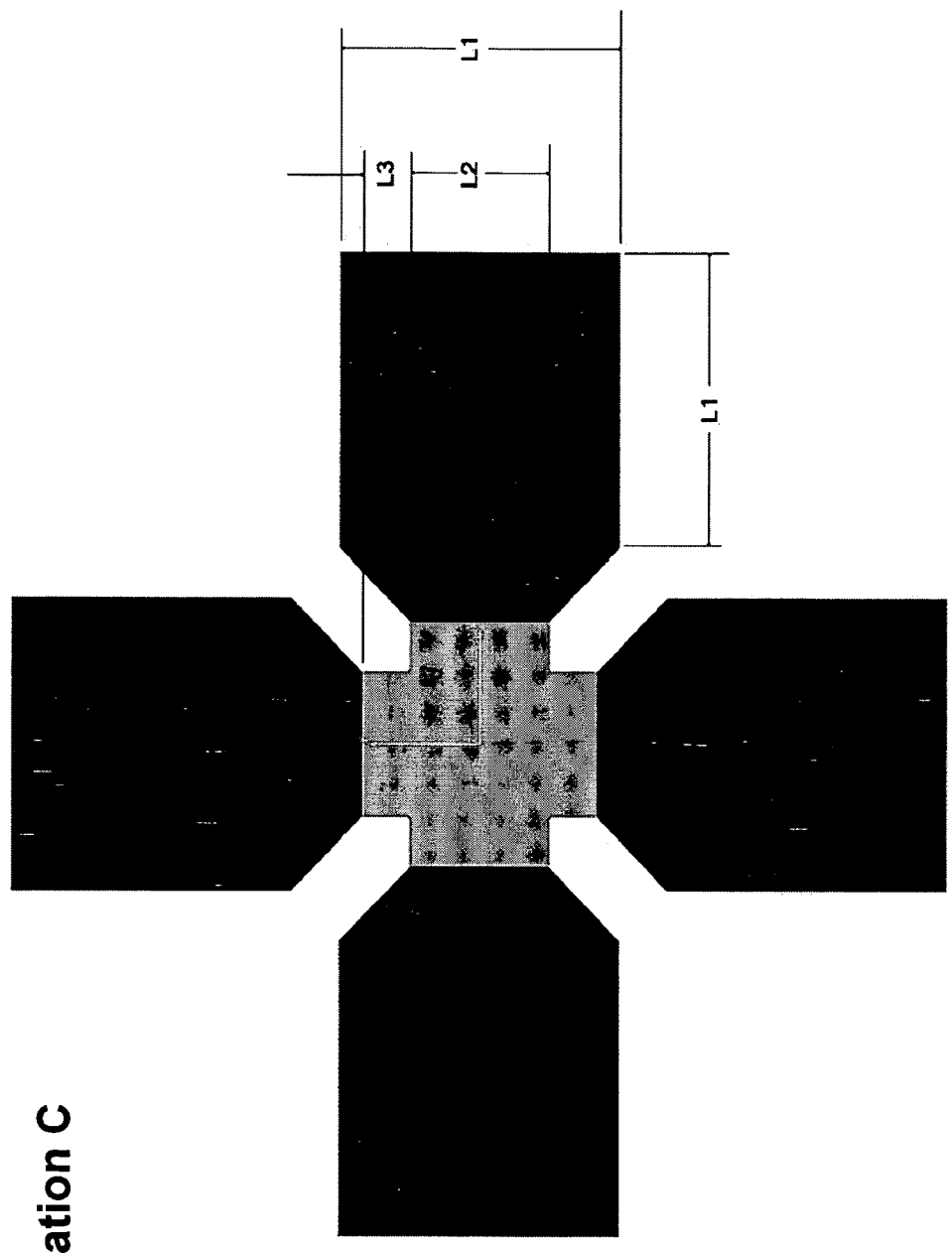

PRESSURE AND TEMPERATURE SENSING ELEMENT

FIELD OF INVENTION

The present invention relates generally to pressure and temperature sensors and, more particularly, to a common configuration of a piezo-resistive element that may sense a piezo-resistance of the element both as a radial resistor and as a tangential resistor.

BACKGROUND

Many piezo-resistive pressure sensors employ a conventional full (4-arm) Wheatstone bridge mechanization, powered by a constant voltage source, to provide a differential voltage output proportional to a pressure sensed. High performance sensors, which may provide accuracy (defined as the sum of the non-compensatable errors) of about 0.012% full scale (FS) or better and long term stability of about 0.02% FS or better over the life of the product, can also include an on-chip full Wheatstone temperature bridge. The temperature output can then be used to compensate and calibrate the pressure output using microprocessor-based electronics, for example. Thus, high performance sensors including both pressure and temperature Wheatstone bridge mechanisms include two separate configurations on the same chip.

Full bridge mechanisms may use ion implanted resistors. For example, the full Wheatstone temperature bridge utilizes a high thermal coefficient of resistance (TCR) light implant element in one set of opposing arms of the Wheatstone bridge and a low TCR heavy implant element in the other set of opposing arms of the Wheatstone bridge that provides an output proportional to temperature.

However, full bridge mechanizations, can be susceptible to non-compensatable errors such as non-ratiometricity errors, power-up drift, thermal hysteresis, and time dependant high temperature induced drift (HTNR). These errors may be related to one or more of the following: a difference in voltage sensitivity of elements in a top of the Wheatstone bridge compared to those in the bottom of the Wheatstone bridge, migration of ionic contaminants in the presence or absence of an electrical field, and the magnitude of the sensor voltage source.

In addition, many sensors also provide on-chip implanted feedback and bias resistors for use with an external operational amplifier. However, this level of complexity can require seven heavy implant elements and up to nine light implant elements for a total of sixteen elements to implement, and a sensor package that requires up to eleven pins with glass-to-metal hermetic seals, all of which add cost to the product.

As a result, existing high performance sensors require complex configurations to enable both pressure and temperature sensing.

SUMMARY

Within embodiments described below, a sensor is provided that includes a single sensing element. The single sensing element has a tangential resistance when current flow is tangential to the sensing element and a radial resistance when current flow is radial to the sensing element. When the sensing element is operated with a constant current source, a difference in the tangential resistance and the radial resistance is a measurement of pressure applied to the sensing element, and a sum of the tangential resistance and the radial resistance is a measurement of an ambient temperature of the sensing element.

In one embodiment, the single sensing element is a square silicon element that has a tangential resistance when current flow is tangential to the single square silicon element and a radial resistance when current flow is radial to the single square silicon element. By changing a direction of current through the single square silicon element, a tangential voltage across the tangential resistance and a radial voltage across the radial resistance can be measured to determine a magnitude of a pressure applied to the single square silicon element and to determine a magnitude of an ambient temperature of the single square silicon element.

As a result, within embodiments described below, a difference in the radial and tangential resistance of the sensing element is proportional to an applied pressure, and a sum of the radial and tangential resistance is proportional to an ambient temperature and is also independent of the applied pressure when the pressure sensitivities of the radial resistance and the tangential resistance are approximately equal and opposite.

These as well as other features and advantages will become apparent to those of ordinary skill in the art by reading the following detailed description, with appropriate reference to the accompanying drawings.

BRIEF DESCRIPTION OF FIGURES

FIGS. 12A-C illustrate examples of three different configurations of the SSS sensor.

DETAILED DESCRIPTION

In one embodiment, one piezo-resistive pressure/temperature sensing element is configured as a single light implant square located at an edge of a diaphragm of the element, and may produce outputs relating to both a pressure and temperature that has been sensed. The piezo-sensing element may operate as a piezo-resistive radial element when a constant current is conducted through the element in the radial direction with respect to the diaphragm. Conversely, the piezo-sensing element may operate as a piezo-resistive tangential element when a constant current is conducted through the element in the tangential direction to the edge of the diaphragm. A difference in the radial and tangential resistances and a corresponding difference in voltage drop are proportional to an applied pressure, while a sum of the same two resistances is a function of temperature and is independent of the applied pressure when pressure sensitivities of the radial and tangential resistance are nominally equal and opposite, for example.

Thus, in one embodiment, a single piezo-resistive element may be operated as both a radial piezo-resistor (Rr) and as a tangential piezo-resistor (Rt), so that when operated with a constant current source, the difference in Rr and Rt is a measurement of pressure and the sum of Rr and Rt is a measurement of temperature. In this manner, the single piezo-resistive element may provide similar functions as provided by both the constant voltage full (4-arm) Wheatstone pressure bridge and the constant voltage full (4 arm) Wheatstone temperature bridge.

I. Single Square Silicon (SSS) Sensor

Figure 1:
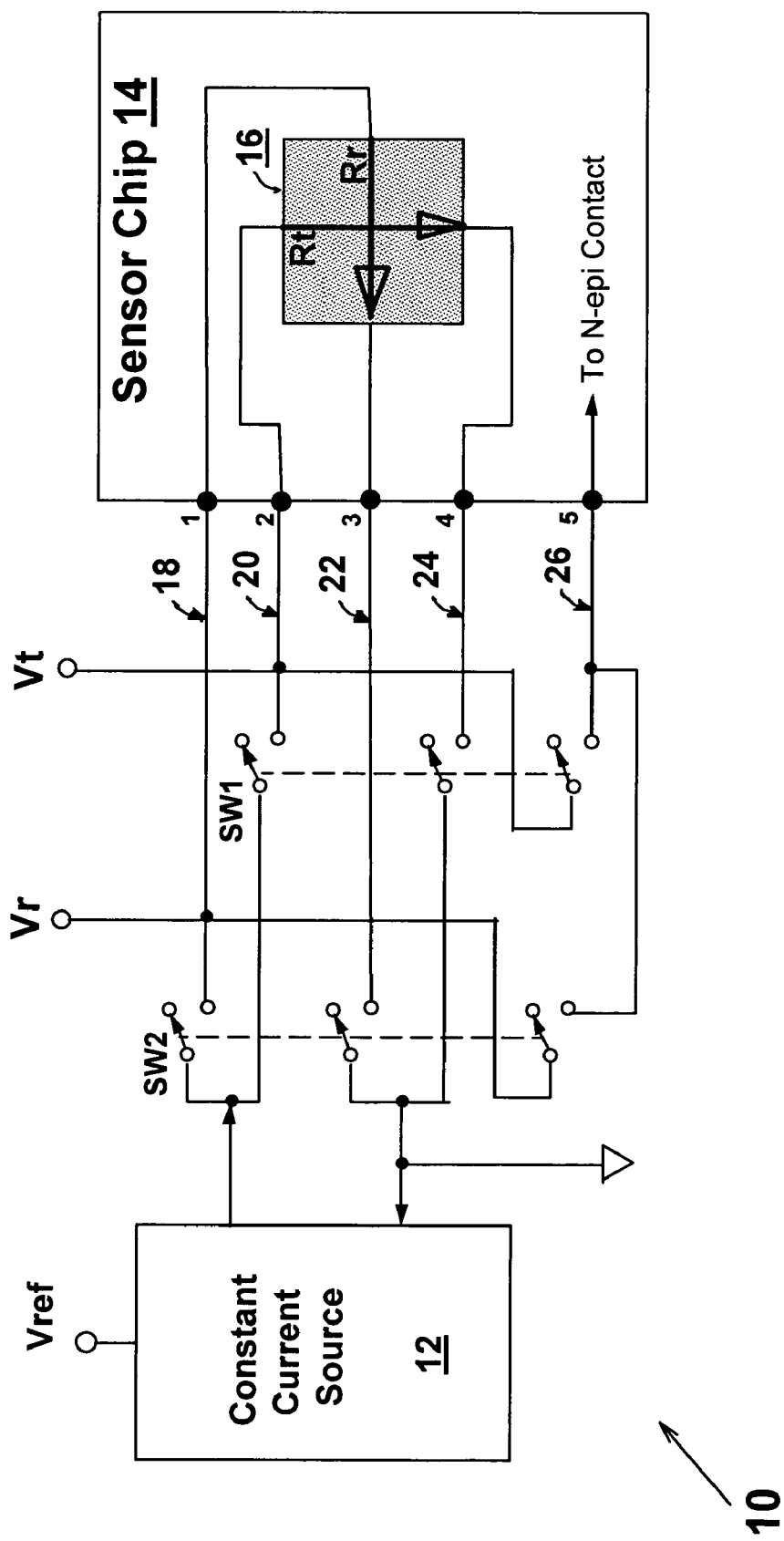
FIG. 1 illustrates a block diagram of one embodiment of a piezo-resistive sensor that utilizes a common square sensing element.

Referring now to the figures, and more particularly to FIG. 1, one embodiment of a piezo-resistive sensor 10, utilizing the SSS sensor concept, is illustrated. It should be understood that the piezo-resistive sensor 10 in FIG. 1 and other arrangements described herein are set forth for purposes of example only, and other arrangements and elements can be used instead and some elements may be omitted altogether, depending on manufacturing preferences.

The piezo-resistive sensor 10 includes a constant current source 12 that drives a single square silicon (SSS) piezo-resistive sensing element 16 located on a sensor chip 14. The constant current source 12 may provide a current of 1 ma, for example. Two 3-stage (normally open) switches connect the current source 12 to the chip 14. As shown, a first switch, SW1, connects the constant current source 12 to the SSS sensing element 16 at nodes 2 and 4, and also connects node 2 to node 5. A second switch, SW2, connects the constant current source 12 to the SSS sensing element 16 at nodes 1 and 3, and also connects node 1 to node 5. The switches SW1 and SW2 could be integrated on the sensor chip 14 itself, for example.

Note that node 5 of the Sensor chip 14 connects to the n-type epitaxial (n-epi) layer of the silicon chip. For bulk-type silicon sensors, for example, the p-type piezo-resistors are ion implanted or diffused into an n-epi layer thereby forming a p-n junction. To maintain a reverse bias on the p-n junction, Node 5 is connected to node 2 when SW1 is closed, and Node 5 is connected to node 1 when SW2 is closed. For Silicon-On-Insulator (SOI) sensors, an insulating layer separates the piezo-resistors from the n-epi layer which eliminates the p-n junction. Therefore, for SOI sensors, Node 5 may be left open.

The sensor chip 14 may be a solid-state device. The sensor chip 14 includes the single square silicon (SSS) piezo-resistive element 16, which senses both applied pressures and ambient temperatures. The SSS element 16 has two inputs: one input is a constant current input from lead 18 (node 2) and returned via lead 22 (node 3) when SW2 is closed and the other input is a constant current input from lead 20 (node 2) and returned via lead 24 (node 4) when SW1 is closed. The SSS element 16 accordingly has two outputs: one output is a radial voltage output ($V_r$) between node 1 to node 3 when SW2 is closed, and the other output is a tangential voltage output ($V_t$) between node 2 and node 4 when SW1 is closed.

The sensor chip 14 may also include a diaphragm upon which the SSS element 16 is mounted (e.g., near an edge of the diaphragm). When a pressure is applied to the diaphragm, a lattice structure of the sensor chip 14 is stressed which (1) causes a change in the tangential piezo-resistance of the SSS element 16 that is proportional to the change in tangential stress and (2) causes a change in the radial piezo-resistance of the SSS element 16 that is proportional to the change in the radial stress and of opposite polarity to that of the tangential resistance. Since the SSS element 16 is operated by a common constant current source, the difference in tangential and radial voltage output measurements is directly proportional to the difference in applied pressure.

For a condition where a change in tangential and radial voltages, due to applied pressure at a constant temperature, are equal in magnitude but opposite in polarity, the sum of the tangential and radial voltages is then directly proportional to the sensed temperature. Further, the sensed temperature is directly proportional to the temperature coefficient of resistance (TCR) of the common piezo-resistor element. Note that, since the pressure and temperature voltages are determined from the same measurements (e.g., the tangential and radial voltages) that are recorded from the same common element, the SSS sensor lessons or eliminates any thermal gradient between the pressure and temperature outputs that exist with conventional sensors that use separate full bridge arrangements for measuring pressure and temperature. In addition, a time response of the pressure and temperature measurements to changes in temperature is identical for the SSS sensor whereas they may not be for conventional sensors (due to the common sensing element). These features enhance the accuracy of the sensor during temperature transitions.

Figure 2:
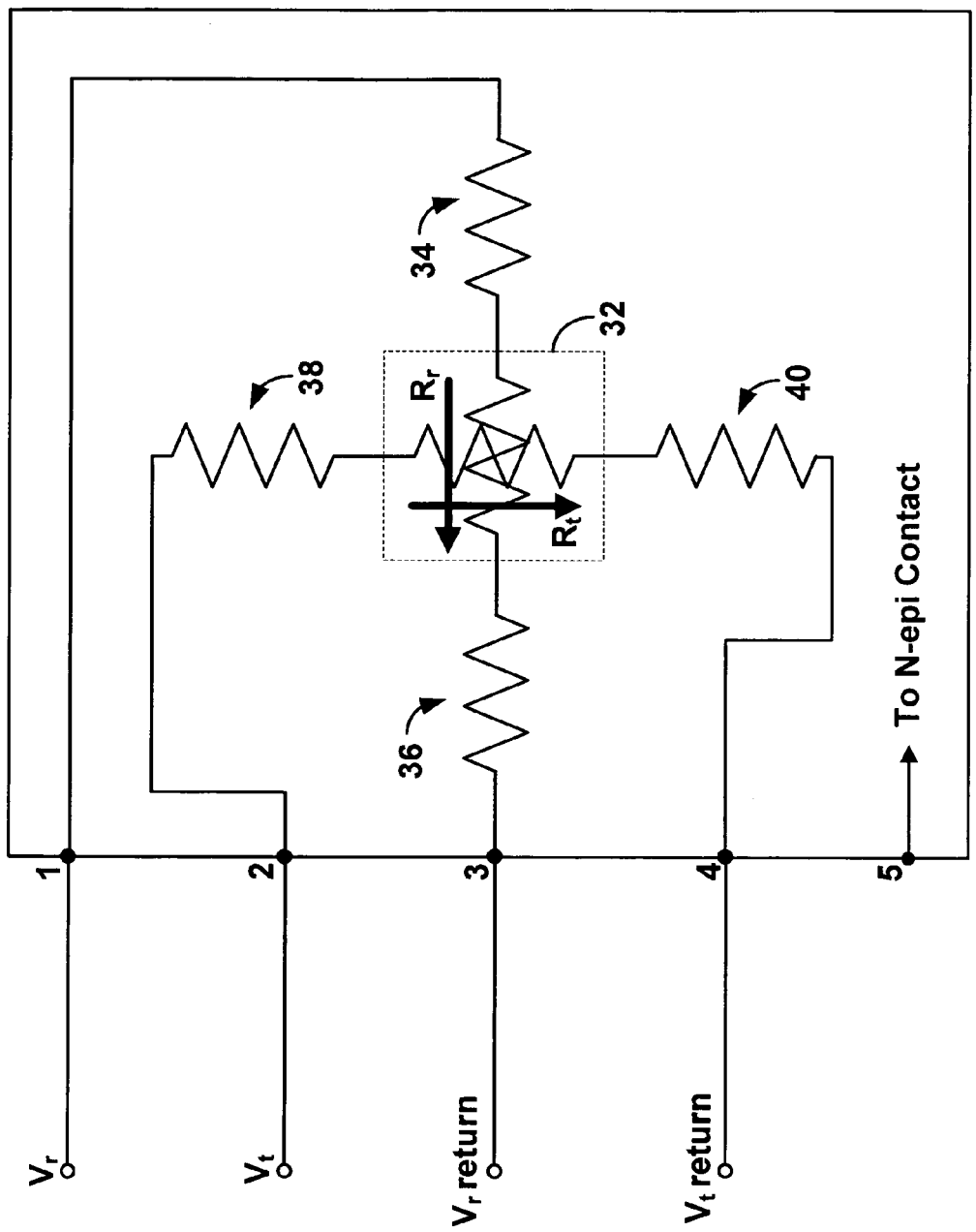
FIG. 2 illustrates an example of a conceptual sensing element.

FIG. 2 illustrates an example of a conceptual sensing element 30. The conceptual sensing element 30 includes a sensing element 32 that can be modeled as a radial resistor ($R_r$) and a tangential resistor ($R_t$) positioned accordingly. A radial voltage ($V_r$) can be measured across leadout resistors 34, 36 and the radial resistor ($R_r$). Similarly, a tangential voltage ($V_t$) can be measured across leadout resistors 38, 40 and the tangential resistor ($R_t$).

The leadout resistors are resistors in series with the piezo-resistor element for connecting an off-diaphragm metal contact to an on-diaphragm sensing element. If it is desirable to have a difference in the radial and tangential voltage to be nominally zero at zero applied differential pressure across the diaphragm, a sum of leadout resistances of resistors 34 and 36 are designed to equal a sum of leadout resistances of resistors 38 and 40. The common piezo-resistance sensing element 32 (Rr,Rt) may have a high sheet resistivity (Rs) and an associated high positive temperature coefficient of resistance (TCR) compared to that of the leadout resistors 34, 36, 38 and 40. The piezo-sensing element 32 also inherently has a high negative temperature coefficient of sensitivity (TCS). Note that for silicon-based ion implanted sensors, high Rs, high TCR resistors are referred to as "light" implant elements and low Rs, low TCR elements are referred to as "heavy" implant elements. For example, the Rs of the sensing element 32 may range from 860 to 2400 ohms/square with a typical TCR of 2600 ppm/° C. at 25° C. whereas the Rs of the leadout resistors may range from 120 to 310 ohms/square with a typical TCR of 600 ppm/° C. at 25° C. When operated in a constant current mode, the positive TCR of the sensor resistance results in an increase in voltage across the sensing element that compensates the negative TCS of the sensing element.

In operation, only the tangential or radial resistor network would be active at one time as described below. The conceptual sensing element provides finctions similar to a full Wheatstone bridge configuration that includes both a pressure and a temperature Wheatstone bridge configuration.

Figure 3:
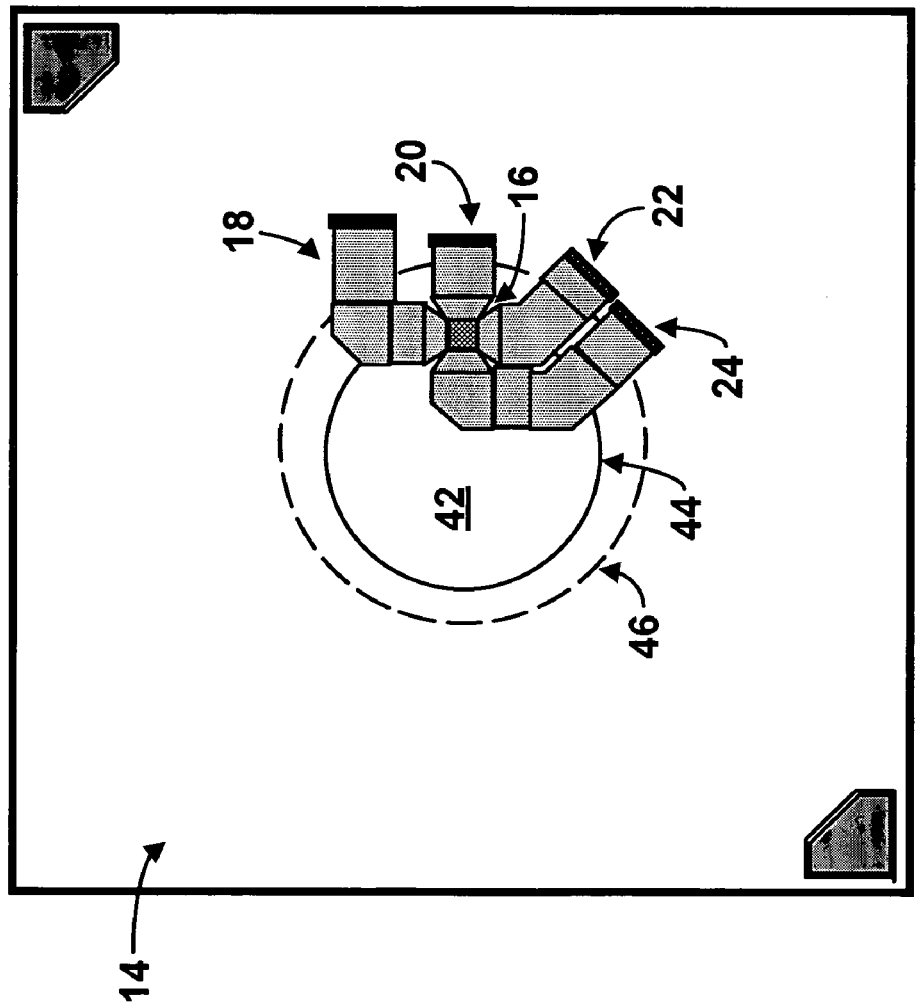
FIG. 3 illustrates one example of a magnified pictorial view of the SSS sensor chip.

FIG. 3 illustrates one example of a magnified pictorial view of the sensor chip 14. The SSS sensor element 16 is mounted on a diaphragm 42 that is formed by electrochemically etching a cavity into a backside of the sensor chip 14, for example. The diameter of diaphragm 42 is indicated by diameter 44. Diameter 46 indicates the diameter of the cavity opening on the backside of sensor chip 14. As shown, the SSS sensor element 16 may be located near the outer edge of diaphragm 42. A maximum stress of the flexible membrane may occur at the edge 44 of the diaphragm 42, and thus, the SSS sensor element 16 can be positioned to maximize the radial and tangential stresses while simultaneously making them nominally equal in magnitude.

Applied pressures to the diaphragm 42 will deflect a flexible membrane of the diaphragm 42, and these stresses in the membrane will change resistances of the SSS sensor element 16. Such changes in resistance in the SSS sensor element 16 will cause a change in radial and tangential output voltages of the SSS chip 14 that are proportional to the applied pressure. For example, a change in applied pressure across the diaphragm from zero pressure to a defined full scale pressure will cause a corresponding typical change in the range of 5% to 15% in the radial and tangential resistances of the SSS sensor element 16 at 25° C. temperature conditions. If the full scale pressure is applied to the front side of the chip, causing the diaphragm 42 to bow in the downward direction, the radial piezo-resistance will increase in value and the tangential piezo-resistance will decrease in value. Conversely, if the full scale pressure is applied to the back-side (cavity side) of the chip causing the diaphragm 42 to bow in the upward direction, the radial piezo-resistance will decrease in value and the tangential piezo-resistance will increase in value. A thickness and diameter of the diaphragm 42, e.g., the aspect ratio of diaphragm, can be selected to be give rise to a certain deflection for a specific full scale applied pressure, which in turn, will result in a certain percentage change in piezo-resistance of the sensing element. For example, a thick diaphragm may result in a small percentage change in resistance on the SSS chip 14 due to an applied pressure, and a thin diaphragm may result in a large percentage change in resistance on the SSS chip 14 from the applied pressure. For this example, the magnitude of the full scale change in resistance of the radial and tangential sensing elements is defined to be equal and opposite and with a value of 10% at 25° C. (or a dR/R=0.10) for illustrative purposes. The dRlR is defined as the gage factor of the piezo-resistor elements.

In addition, in another example, the SSS sensor element 16 may be used to sense static pressure by placing an additional SSS sensor element 16 off the diaphragm and onto the thick portion of the sensor chip 14, as depicted in FIG. 3A. In applications that require a low differential pressure measurement with a high common-mode or static pressure range, such as industrial control for example, the differential pressure measurement may also have some sensitivity to the static pressure and, therefore, a static pressure measurement may be needed for correcting the differential measurement.

II. Single Square Silicon (SSS) Sensor Operation

Figure 4:
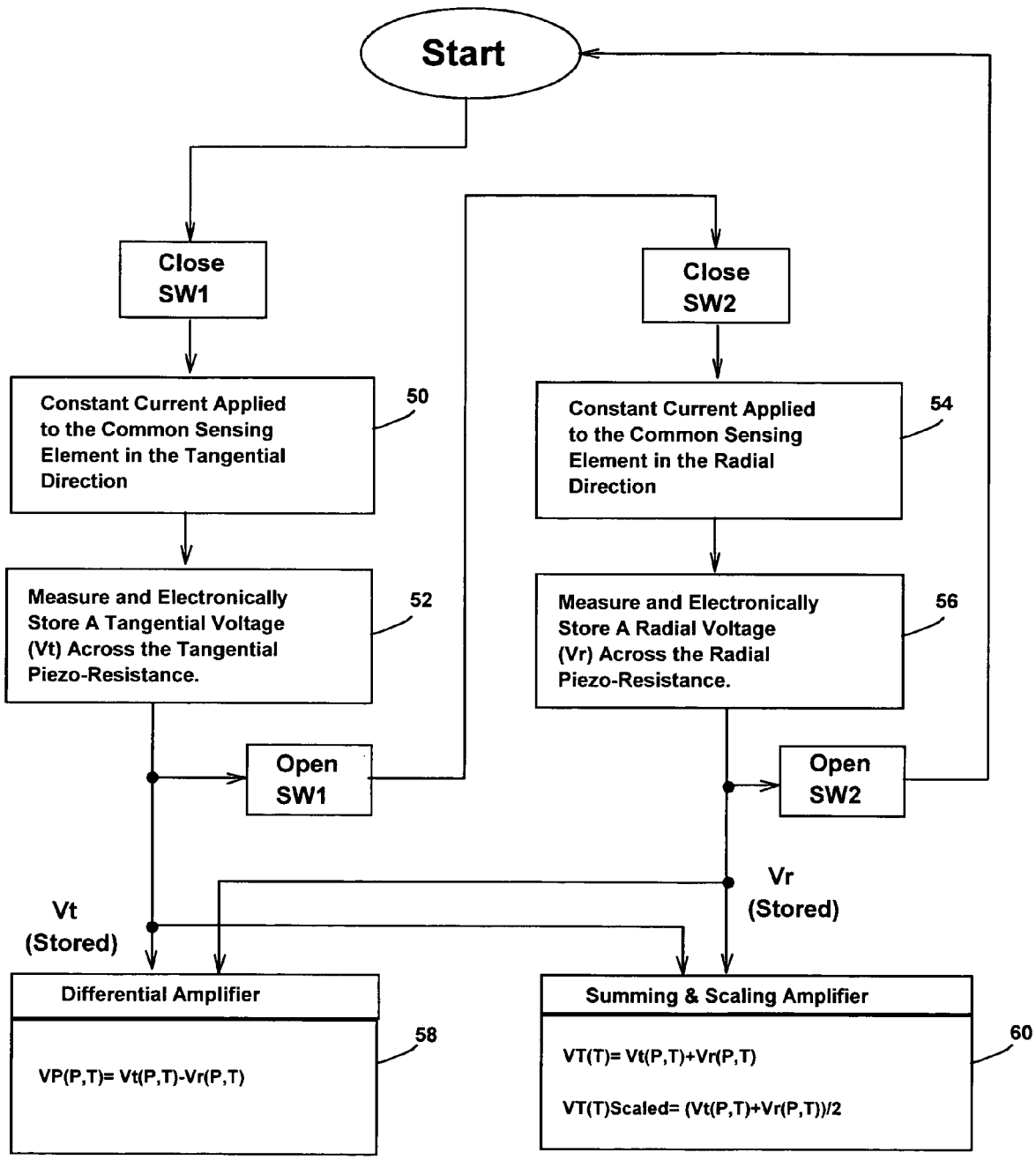
FIG. 4 is a flowchart depicting an example of functional blocks of a method for measuring pressure and temperature using a common sensing element.

FIG. 4 is a flowchart depicting an example of functional blocks of a method for measuring pressure and temperature using a common sensing element. The common sensing element may be the SSS sensor element 16 of sensor chip 14, for example, as illustrated in FIG. 1. In such an example, the common sensing element has a tangential resistance when current flow is tangential to the common sensing element and a radial resistance when current flow is radial to the common sensing element. As shown at block 50, initially a constant current is applied through the common sensing element in the tangential direction. A tangential voltage across the tangential resistance can then be measured and stored, as shown at block 52. Next, as shown at block 54, a constant current is applied through the common sensing element in the radial direction. A radial voltage across the radial resistance can then be measured, as shown at block 56. Following, a magnitude of voltage proportional to the magnitude of pressure applied to the common sensing element and a magnitude of voltage proportional to the ambient temperature of the common sensing element can be determined using the tangential voltage and the radial voltage, as shown at block 58 and 60, respectively.

In particular, referring to FIG. 1, when the SSS chip 14 is driven by the current source 12, outputs of the SSS chip 14 can be associated with a pressure or temperature as applied to the sensing element 10. Two resistances can be measured across the square silicon element 16. A resistance for the condition where current flow is tangential to the square 16 is defined as the tangential resistance $R_t$. This condition applies when SW1 is closed and SW2 is open. Conversely, a resistance for the condition where current flow is radial to the square 16 is defined as the radial resistance $R_r$. This condition applies when SW2 is closed and SW1 is open. Thus, a voltage $V_t$, at node 2 to node 4, is found as follows:

$$V_t = \left(1 + \frac{dR_t}{R_t}\right)R_t I_{cc} \qquad \text{Eq. (1)}$$

where $I_{cc}$ is the current applied from the constant current source and $$\frac{dR_t}{R_t}$$

is the tangential piezoresistive gage factor.

A voltage $V_r$, at node 1 to node 3, is similarly found as follows:

$$V_r = \left(1 - \frac{dR_r}{R_r}\right) R_r I_{cc} \qquad \text{Eq. (2)}$$

where $$\frac{dR_r}{R_r}$$

is the radial piezoresistive gage factor.

For conditions of $R_t = R_r = R_o$, and $$\left|\frac{dR_t}{R_t}\right| = \left|\frac{dR_r}{R_r}\right| = \left|\frac{dR_o}{R_o}\right|,$$

then the differential voltage dV proportional to pressure is the difference of $V_t$ and $V_r$ as follows:

$$dV = (V_t - V_r) = 2\left(\frac{dR}{R_o}\right)(R_o I_{cc}) = 2\left(\frac{dR}{R_o}\right)(V_{cm}) \qquad \text{Eq. (3)}$$

where $(R_o I_{cc}) = V_{cm}$ is the common mode voltage drop across the SSS chip 14 for both the tangential and radial operating modes at pressure=0 conditions. As one example, for $R_o$=2.5 k ohm and $I_{cc}$=1 ma, $V_{cm}$=2.5 volts. Thus, an applied pressure to the SSS chip 14 is proportional to the difference between the tangential and radial voltage measured across the SSS element 16.

Note that if $V_{cm}$ is designed to be half of the $V_{ref}$ voltage of the current source 12, Eq. (3) then becomes:

$$dV = \left(\frac{dR}{R_o}\right) V_{ref} \qquad \text{Eq. (4)}$$

Equation (4) is that of a full Wheatstone bridge pressure sensor configuration operating with a constant voltage source of $V_{ref}$. Thus, the sensing element 10 can provide the same pressure voltage output as that of full Wheatstone bridge sensors, but accomplishes such with a single piezoresistive element rather than four, for example.

In addition, outputs of the SSS chip 14 can also be associated with an ambient temperature of the sensing element 10. A temperature signal designated as VT is defined as the sum of $V_t$ and $V_r$, which are defined in Equations (1) and (2) above. Therefore, VT is defined as follows:

$$VT = (V_t + V_r) = \left(\left(1 + \frac{dR_t}{R_t}\right) R_t I_{cc}\right) + \left(\left(1 - \frac{dR_r}{R_r}\right) R_r I_{cc}\right) \qquad \text{Eq. (5)}$$

For $|dR_t|=|dR_r|$, then VT(T) becomes:

$$VT(T) = [R_r(T) + R_t(T)] I_{cc} \qquad \text{Eq. (6)}$$

and VT is then independent of pressure. Thus, an ambient temperature of the SSS chip 14 is proportional to the sum of the tangential and radial voltage measured across the SSS element 16.

Thus, using the same common sensing element, e.g., the SSS element 16, to measure both pressure and temperature lessens or eliminates any temperature gradient between the pressure and temperature signal since the same measurements of the same element are used for both. For example, compensations of pressure measurements using the temperature measurements may be more accurate since the pressure and temperature measurements originate from the same sensing element.

III. Example Layouts of the SSS Sensor

Figure 5C:
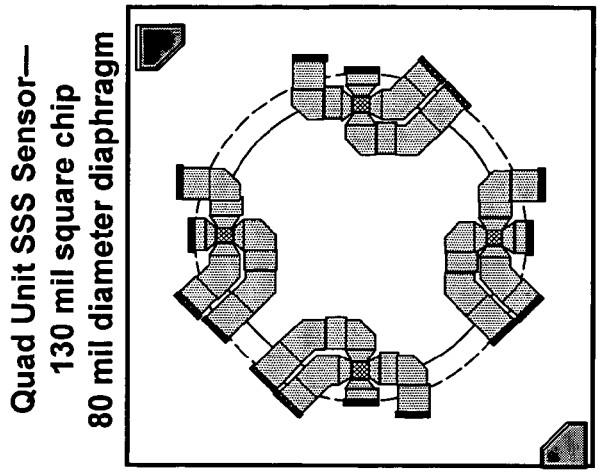
FIGS. 5A-5C illustrate example layouts of the SSS Sensor cell for different diaphragm diameters.
Figure 5B:
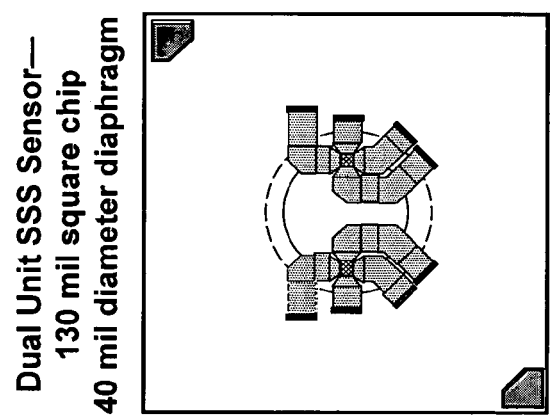
Figure 5A:
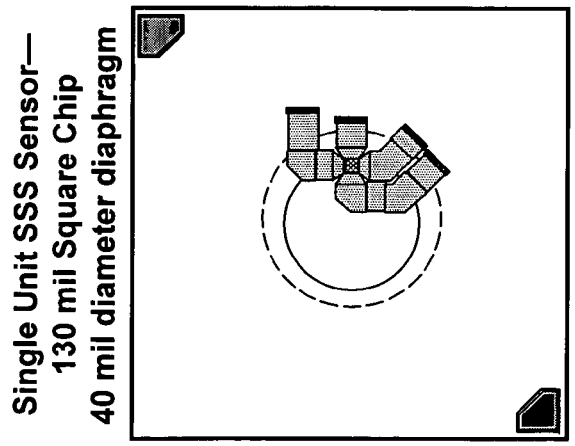

FIGS. 5A-5C illustrate example layouts of the SSS Sensor cell for different diaphragm diameters for sensing differential pressure across the diaphragm. In FIGS. 5A-5C, on chip interconnects and bonding pads are not shown.

FIG. 5A illustrates one example of a single unit design that has one single square silicon (SSS) cell. In this example, the sensor chip is a 130 mil square chip that includes a 40 mil diameter diaphragm. The single unit design with $R1_o$=2.8 kohms, $R2_o$=2.8 kohms, and a constant current source of $I_{cc}$=0.893 ma has the following outputs:

TABLE 1

| | |
|---|---|
| $R1_o$ = 2.8 kohms | Where $R1_o$ = R38 + $Rt_o$ + R40 @zero pressure & 25° C. (See FIG. 2) |
| $R2_o$ = 2.8 kohms | Where $R2_o$ = R34 + $Rr_o$ + R36 @zero pressure & 25° C. (See FIG. 2) |
| $I_{cc}$ = 0.893 ma | Where Icc = Fixed Constant Current |
| $dV_{out}$ = 250 mV @25 C. | Where dVout = (Vt − Vr) @FS pressure & 25° C. |
| $V_{chip}$ = $I_{cc} R_o$ = 2.5 V @25° C. | Where Vchip is the voltdrop on the chip @zero pressure & 25° C. |
| VT = $2I_{cc} R(T)$ = 5.0 V @25° C. | Where VT = Temperature Voltage = (Vt + Vr) @25° C. |

In one embodiment, a magnitude of the constant current source 12 is that value which sets the voltage drop across the SSS sensor element 14 to be about 2.5 volts at zero pressure and 25° C., which reduces the SSS chip voltage potential to be one-half of that required for typical full bridge configurations. This reduction in chip voltage, which may be operated at a 10% duty cycle, for example, may reduce errors associated with voltage effects and ionic migration of contaminants, such as ratiometricity error, power-up drift and time dependant high temperature drift, for example.

If the constant current source 12 is switched between the radial and tangential resistances at a 10% duty cycle, for example, then the average current, and therefore power consumption, could be comparable to that of typical full Wheatstone bridge configurations. However, the constant current source 12 can be switched at any frequency or any duty cycle as desired.

FIG. 5B illustrates one example of a dual unit design that has two single square silicon embedded at opposite edges of the diaphragm. In this example, the chip is 130 mils square and includes a 40 mil diameter diaphragm. The two individual single units can be connected in series or in parallel. If an application requires a higher input impedance, the individual single sensor units may be connected in series. Conversely, if an application requires a lower input resistance, the individual single sensor units may be connected in parallel. Some applications may require electrical redundancy, and in this case, the two individual single sensor units may be operated electrically separate but with a shared common diaphragm. The dual unit chip design, with $R1_o$=2.8 kohms and $R2_o$=2.8 kohms for each single unit, and with the parameters defined as in Table 1 above, has the following parameters and outputs:

TABLE 2

| Connected in Series | Connected in Parallel |
|---|---|
| $R1_o$ = 5.6 kohms | $R1_o$ = 1.4 kohms |
| $R2_o$ = 5.6 kohms | $R2_o$ = 1.4 kohms |
| $I_{cc}$ = 0.446 ma | $I_{cc}$ = 1.786 ma |
| $dV_{out}$ = 250 mV @25° C. | $dV_{out}$ = 250 mV @25° C. |
| $V_{chip}$ = $I_{cc}R_o$ = 2.5 V @25° C. | $V_{chip}$ = $I_{cc}R_o$ = 2.5 V @25° C. |
| VT = $2I_{cc}R(T)$ = 5.0 V @25° C. | VT = $2I_{cc}R(T)$ = 5.0 V @25° C. |

Note that setting the constant current Icc for the parallel connection equal to four times the series connection, all outputs are the same for the same conditions.

FIG. 5C illustrates one example of a quad unit design that has four single square silicon chips mounted side by side on the diaphragm. In this example, the chips are 130 mil square chips that include a 80 mil diameter diaphragm. The four individual single units can be connected in series or in parallel. If an application requires a high input impedance, the four individual single sensor units may be connected in series. Conversely, if an application requires a low input resistance, the individual single sensor units may be connected in parallel. Some applications may require electrical redundancy, and for these instances, the four individual single sensor units may be operated electrically separate to provide quadruple redundancy but sharing a common diaphragm. The quad unit chip design, with $R1_o$=2.8 kohms and $R2_o$=2.8 kohms for each single unit, has the following parameters and outputs:

TABLE 3

| Connected in Series | Connected in Parallel |
|---|---|
| $R1_o$ = 11.2 kohms | $R1_o$ = 0.7 kohms |
| $R2_o$ = 11.2 kohms | $R2_o$ = 0.7 kohms |
| $I_{cc}$ = 0.223 ma | $I_{cc}$ = 3.572 ma |
| $V_{out}$ = 250 mV | |
| $V_{chipout}$ = $I_{cc}R_o$ = 2.5 V @25° C. | |
| VT = $2I_{cc}R(T)$ = 5.0 V @25° C. | |

Note that setting the constant current (Icc) for the parallel connection equal to sixteen times the series connection, all outputs are the same for the same conditions.

IV. Performance Characteristics of the Bulk Silicon SSS Sensor.

The SSS Sensor chip may be fabricated using similar processes as currently being used to fabricate conventional sensors, such as those in full Wheatstone bridge configurations on either bulk silicon or silicon-on-insulator (SOI) substrates, for example.

The performance of a bulk silicon-based ion implanted sensor over pressure and temperature can be determined by the resistance change of a light implant element (Rr and Rt) as a function of temperature with respect to 25° C. and expressed as the ratio of Rr(T)/Rr(25° C.) and the ratio of Rt(T)/Rt(25° C.), respectively. This can be defined by the following $5^{th}$ order polynomial (referred to as K1(T)):

$$K1(T)=(5.9029E\text{-}13)T^5+(5.0973E\text{-}11)T^4-(3.6095E\text{-}08)T^3+(9.2880E\text{-}06)T^2+(2.3461E\text{-}03)T+(0.93647) \qquad \text{Eq. (7)}$$

The performance of the sensor can also be estimated by the resistance change of the heavy implant elements (resistors 34 (R34), 36 (R36), 38 (R38) and 40 (R40)) as a function of temperature with respect to 25° C. and expressed as the ratio of R34(T)/R34(25° C.), the ratio of R36(T)/R36(25° C.), the ratio of R38(T)/R38(25° C.), and the ratio of R38(T)/R38(25° C.), respectively, which can be characterized by the following $5^{th}$ order polynomial (referred to as K2(T)):

$$K2(T)=(1.3905E\text{-}13)T^5+(6.577E\text{-}11)T^4-(2.6472E\text{-}08)T^3+(7.6146E\text{-}06)T^2+(1.0450E\text{-}04)T+(0.99307) \qquad \text{Eq. (8)}$$

The constant voltage (CV) pressure sensitivity or CV Span of the piezo-resistor elements (Rr and Rt) as a function of temperature with respect to 25° C. (expressed as the ratio of Span(T)/Span(25° C.)) can be defined by the following polynomial (referred to as K3(T)):

$$K3(T)=(1.6451E\text{-}13)T^5+(9.64136E\text{-}11)T^4-(2.90655E\text{-}08)T^3+(7.92179E\text{-}06)T^2+(2.57691E\text{-}03)T+(1.05986) \qquad \text{Eq. (9)}$$

Figure 6:
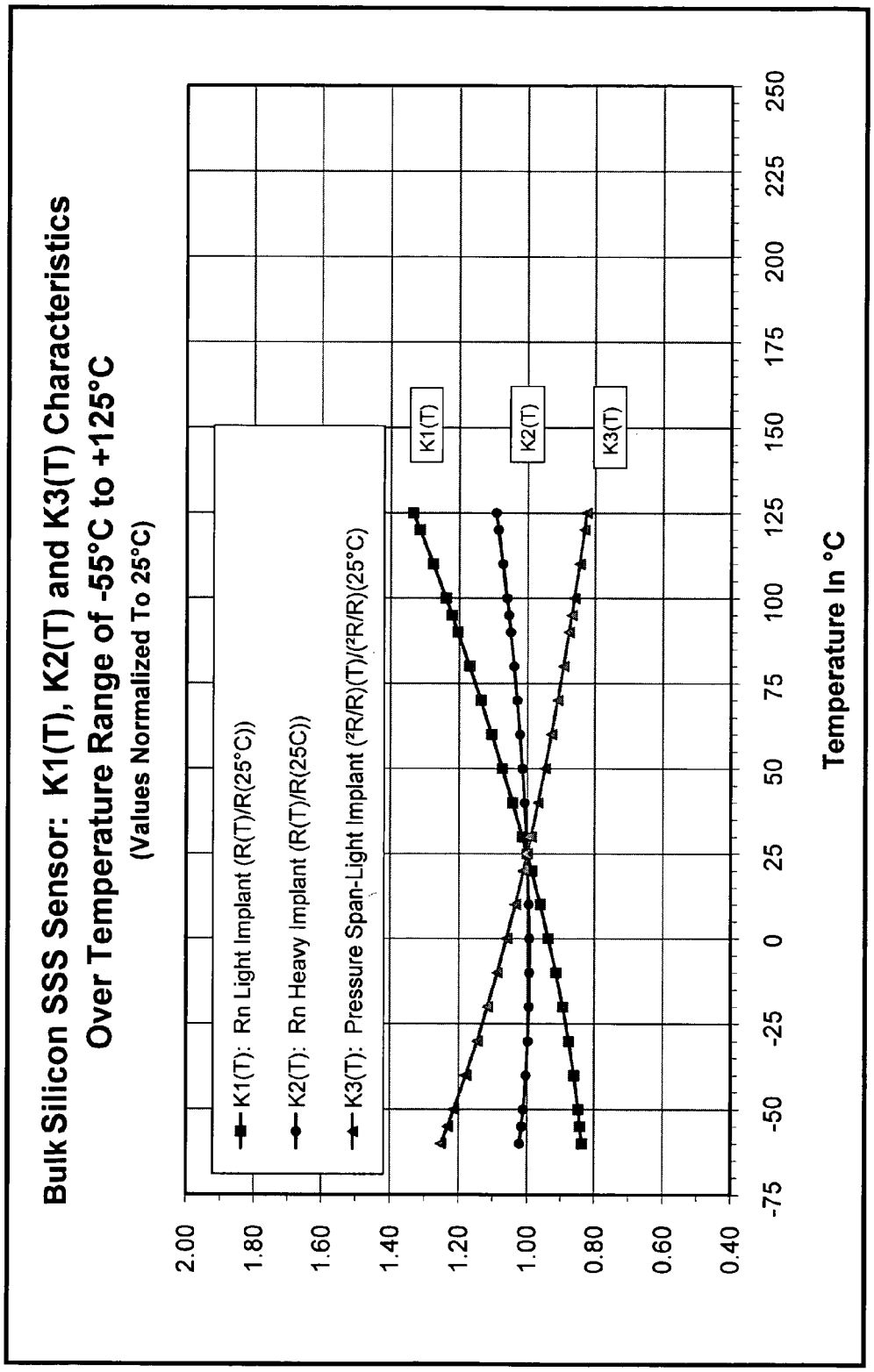
FIG. 6 illustrates an example plot of K1(T), K2(T), and K4(T) polynomials that define the light implant resistance, the heavy implant resistance and the pressure span as a function of temperature, normalized to +25° C., for a bulk silicon SSS sensor.

Example plots of K1(T), K2(T) and K3(T) over the temperature range of –55° C. to +125° C. are shown in FIG. 6.

In bulk-based silicon sensors, the p-type sensor elements are implanted into an n-type epitaxial (n-epi) layer, and therefore a p-n junction is formed. The n-epi layer is normally tied to the positive side of the excitation voltage that provides a reverse bias on the p-n junction. Because of the reverse bias, leakage current effects of the junction double about every 10° C., and so the upper operating temperature range is usually limited to +125° C. For SOI sensors, the p-type sensor elements are fabricated on top of an isolation layer that eliminates the p-n junction. Therefore, the upper operating temperature for SOI Based sensors can be higher than a bulk-based sensor.

A dopant concentration of the "light" implant resistance (K1), for this bulk silicon example, is nominally $3\times10^{17}$ ions per cubic centimeter that results in a high positive temperature coefficient of resistance (TCR) as depicted in FIG. 6. The TCR is approximately 2600 ppm/° C. at 25° C. and exhibits a gradual increase with increasing temperature.

A dopant concentration of the "heavy" implant resistance (K2), for this example, is nominally $1\times10^{19}$ ions per cubic centimeter that results in a low positive temperature coefficient of resistance (TCR) as depicted in FIG. 6. The TCR is approximately 600 ppm/° C. at 25° C. and also exhibits a gradual increase with increasing temperature. The TCR, however, goes to 0 ppm/° C. at approximately –10° C. and then exhibits a low negative TCR characteristic from –55° C. to –10° C.

The normalized pressure sensitivity (K3) (defined as ΔR/R(T)/ΔR/R(25° C.)) of the piezo element, for this example, has a negative temperature coefficient of sensitivity (TCS) as shown in FIG. 6. The typical change in sensitivity for the case of constant voltage across the piezo-element is approximately –0.25%/° C. or –2500 ppm/° C. This decrease in sensitivity with increasing temperature is an intrinsic characteristic of the piezo effect of silicon and is relatively independent of doping concentrations. Note that, for this example, the magnitude of the positive TCR of the "light" implant piezo element is approximately equal to the negative magnitude of the constant voltage TCS of the "light" piezo element. Therefore, when operated with constant current (CC), the voltage across the element will increase with increasing temperature in accordance with K1(T), which will offset the decrease in sensitivity in accordance with K3(T).

For example, at 25° C., a one (1) ° C. increase in temperature will cause the voltage across the element to increase by approximately 0.26%, which will offset the approximate decrease in sensitivity of approximately 0.25%, resulting in a net change in sensitivity of only +0.01%.

Figure 7:
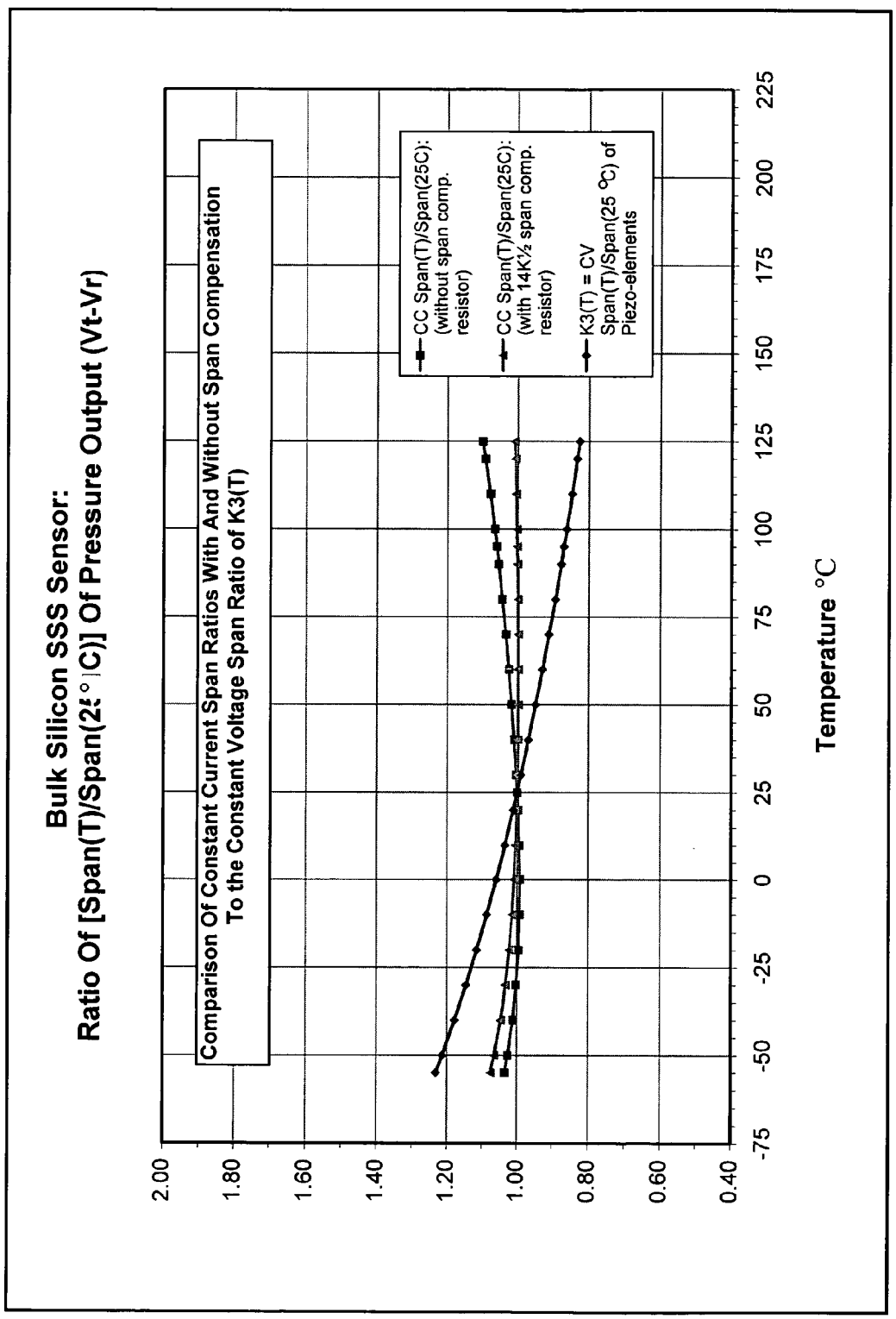
FIG. 7 illustrates an example plot of a CC span shift as a function of temperature with and without span compensation for the bulk silicon SSS sensor.

Equations (1)-(6) above combined with the three polynomials K1(T), K2(T) and K3(T) can be used to generate a circuit model for the example of the single unit design as depicted and defined in FIG. 5A and Table 1 above. Example modeled ratios of the constant current Span(T)/Span(25° C.), with and without a compensation resistor, over the temperature range of 55° C. to +125° C. are plotted in FIG. 7. The CV Span Ratio as defined by the K3(T) polynomial is also plotted for comparison purposes. At the +125° C. temperature point, the uncompensated CC span shift increases to approximately +10% (ratio of 1.10), whereas the CC compensated span shift is less than ±1.0% over the temperature range of 0° C. to +125° C. The span compensation includes placing a 14,000 ohm resistor, with a nominal zero TCR, in parallel with each sensing element (between pins 1 and 3 and between pins 2 and 4 as designated in the diagram of FIG. 1). The same compensation would be achieved by placing the 14,000 ohm resistor directly across the current source. For this example, the compensating resistor would be continuously powered rather than only powered when switched.

Figure 8:
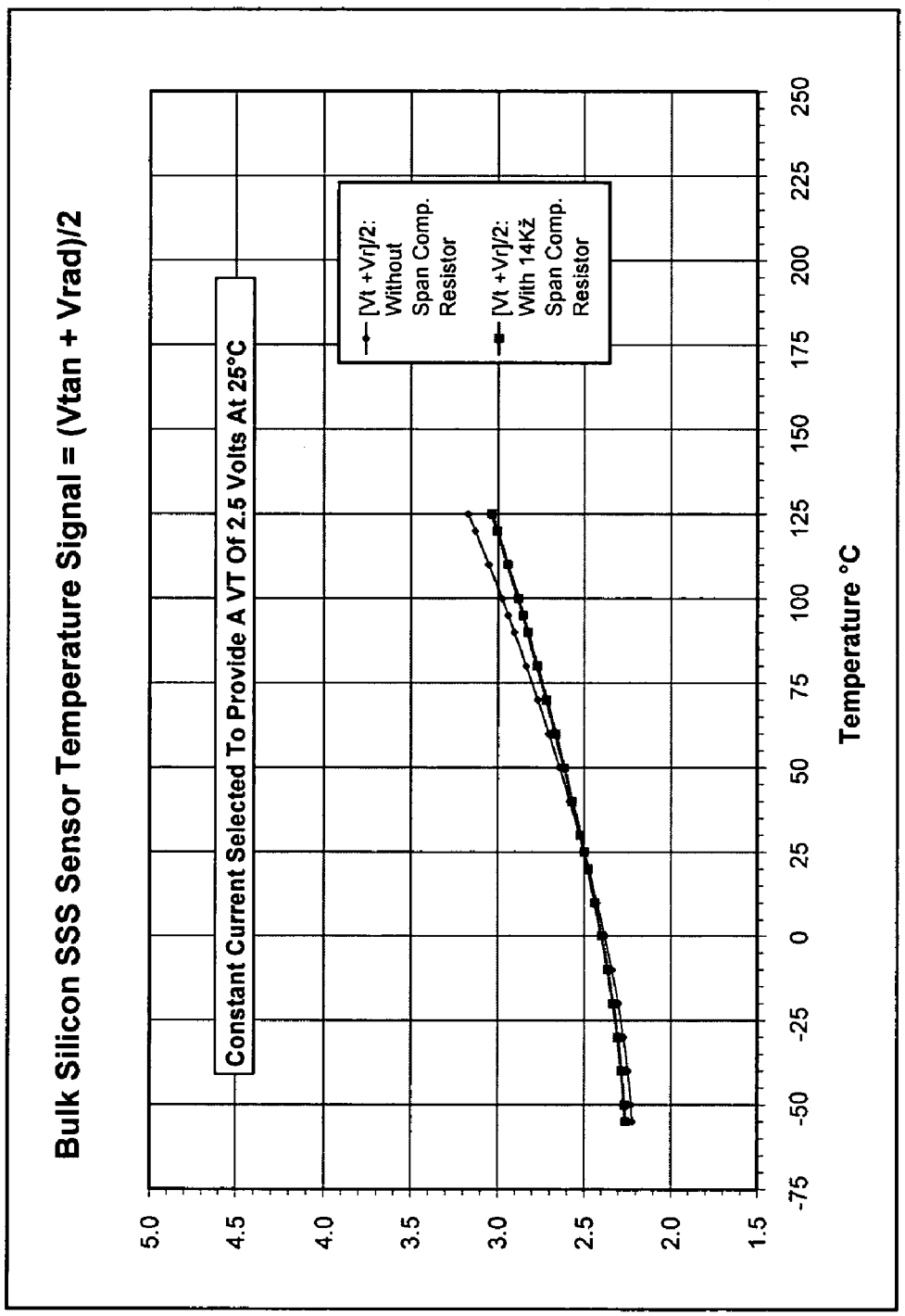
FIG. 8 illustrates an example plot of a temperature output as a function of temperature with and without span compensation for the bulk silicon SSS sensor.

The circuit model also provides the output characteristics of the temperature signal VT, defined to be equal to (Vt+Vr)/2. FIG. 8 shows VT over the range of −55° C. to +125° C. for the two cases of "with" and "without" span compensation. The signal level would be approximately 25% less for the "with" span compensation case. However, the signal sensitivity is about 5 mv/° C., which is about the same as a conventional full wheatstone bridge configuration operating with 5 volts excitation.

V. Performance Characteristics of the SOI Silicon SSS Sensor

The performance of a SOI based ion implanted sensor over pressure and temperature can also be determined using the factors discussed above. In particular, the resistance change of the light implant elements (Rr and Rt) as a function of temperature with respect to 25° C. can be determined and expressed as the ratio of Rr(T)/Rr(25° C.) and the ratio of Rt(T)/Rt(25° C.), respectively. This can be characterized by the following $5^{th}$ order polynomial (referred to as K4(T)):

$$K4(T)=(8.171496E\text{-}14)T^5+(9.930398E\text{-}11)T^4-(3.557091E\text{-}08)T^3+(9.691127E\text{-}06)T^2+(2.958093E\text{-}03)T+(0.920508)$$ Eq. (10)

The resistance change of the heavy implant elements (resistors 34, 36, 38 and 40) as a function of temperature with respect to 25° C. and expressed as the ratio of R34(T)/R34(25° C.), the ratio of R36(T)/R36(25° C.), the ratio of R38(T)/R38(25° C.), and the ratio of R38(T)/R38(25° C.), respectively, and can be characterized by the following $5^{th}$ order polynomial (referred to as K5(T)):

$$K5(T)=(-3.018497E\text{-}14)T^5+(4.603604E\text{-}11)T^4-(2.282857E\text{-}08)T^3+(7.53850E\text{-}06)T^2-(2.252834E\text{-}05)T+(0.996191)$$ Eq. (11)

The constant voltage (CV) pressure sensitivity or CV Span of the piezo-resistor elements (Rr and Rt) as a function of temperature with respect to 25° C. and can be expressed as the ratio of Span(T)/Span(25° C.), and characterized by the following polynomial (referred to as K6(T)):

$$K6(T)=(-6.265753E\text{-}14)T^5+(5.393845E\text{-}11)T^4-(2.440481E\text{-}08)T^3+(8.022881E\text{-}06)T^2+(2.585262E\text{-}03)T+(1.058300)$$ Eq. (12)

Figure 9:
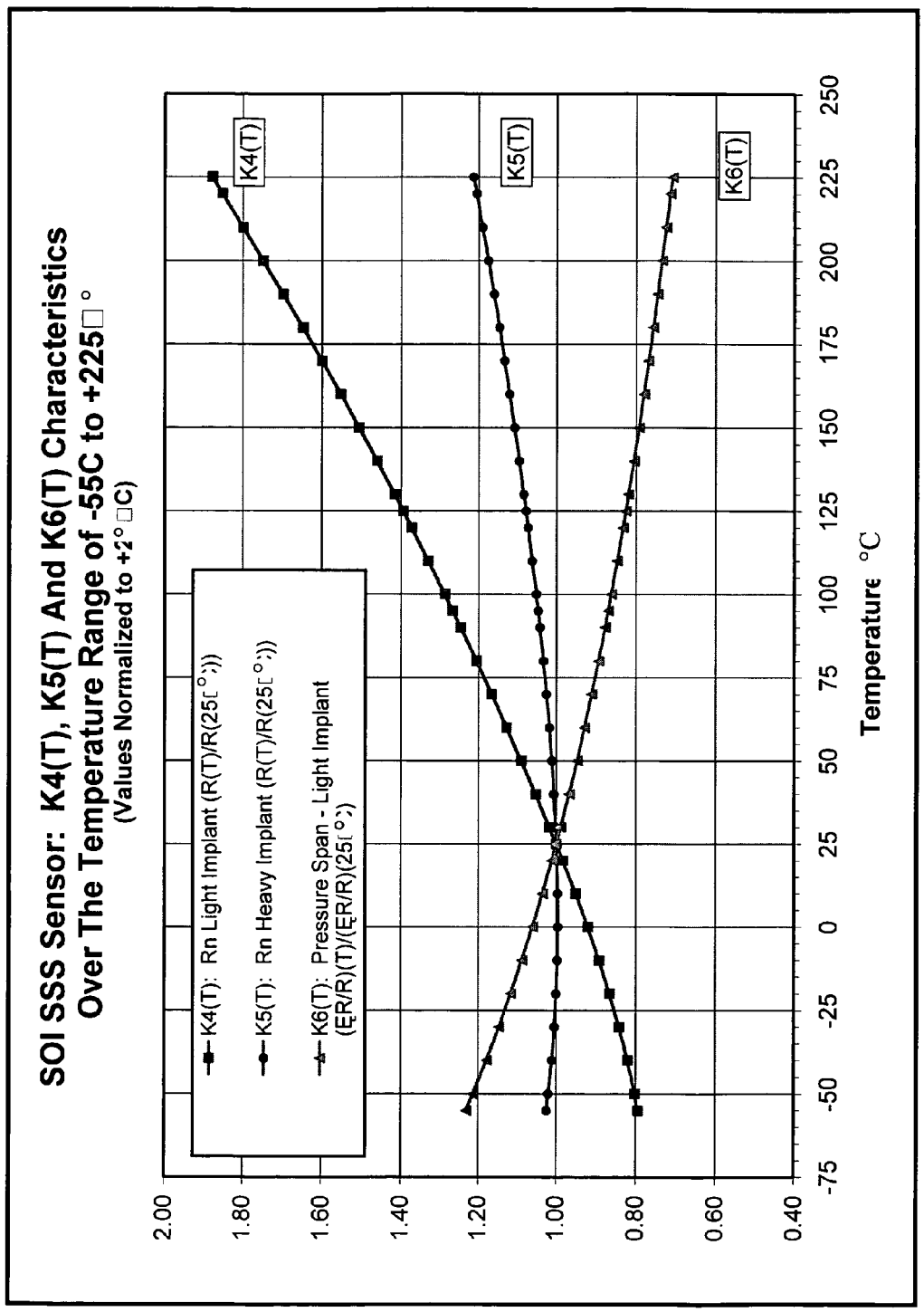
FIG. 9 illustrates an example plot of K1(T), K2(T), and K4(T) polynomials that define the light implant resistance, the heavy implant resistance and the pressure span as a function of temperature, normalized to +25° C., for a SOI silicon SSS sensor.

Example plots of K4(T), K5(T) and K6(T) over the temperature range of −55° C. to +225° C. are shown in FIG. 9. For SOI sensors, the p-type sensor elements are fabricated on top of an isolation layer thatr eliminates the p-n junction that exist in the bulk-based sensors described above. Therefore, the upper operating temperature for SOI Based sensors can be extended. For this example, the upper operating temperature is extended to about +225° C.

A dopant concentration of the "light" implant resistance (K4), for this example, is nominally 3×10^17 ions per cubic centimeter, which results in a high positive temperature coefficient of resistance (TCR) as depicted in FIG. 9. The TCR is approximately 2600 ppm/° C. at 25° C. and exhibits a gradual increase with increasing temperature.

A dopant concentration of the "heavy" implant resistance (K5), for this example, is nominally 1×10^19 ions per cubic centimeter, which results in a low positive temperature coefficient of resistance (TCR) as depicted in FIG. 9. The TCR is approximately 600 ppm/° C. at 25° C. and also exhibits a gradual increase with increasing temperature. The TCR, however, goes to 0 ppm/° C. at approximately −10° C., and then exhibits an low negative TCR characteristic from −55° C. to −10° C.

A normalized pressure sensitivity (K6) (defined as ΔR/R(T)/ΔR/R(25° C.)) of the piezo element, for this example, has a negative temperature coefficient of sensitivity (TCS) as shown in FIG. 9. The change in sensitivity for the case of constant voltage across the piezo-element is approximately −0.25%/° C. or −2500 ppm/° C. This decrease in sensitivity with increasing temperature is an intrinsic characteristic of the piezo effect of silicon and is relatively independent of the doping concentrations. Note that, for this example, the magnitude of the positive TCR of the "light" implant piezo element is approximately equal to the negative magnitude of the constant voltage TCS of the "light" piezo element. Therefore, when operated with constant current (CC), the voltage across the element will increase with increasing temperature in accordance with K4(T) which will offset (compensate) the decrease in sensitivity in accordance with K6(T). For example at 25° C., a one (1) ° C. increase in temperature will cause the voltage across the element to increase by approximately 0.26%, which will offset the approximate decrease in sensitivity of approximately 0.25%, resulting in a net change in sensitivity of only +0.01%. Optimization of this CC compensation over the entire operating range is addressed below.

Figure 10:
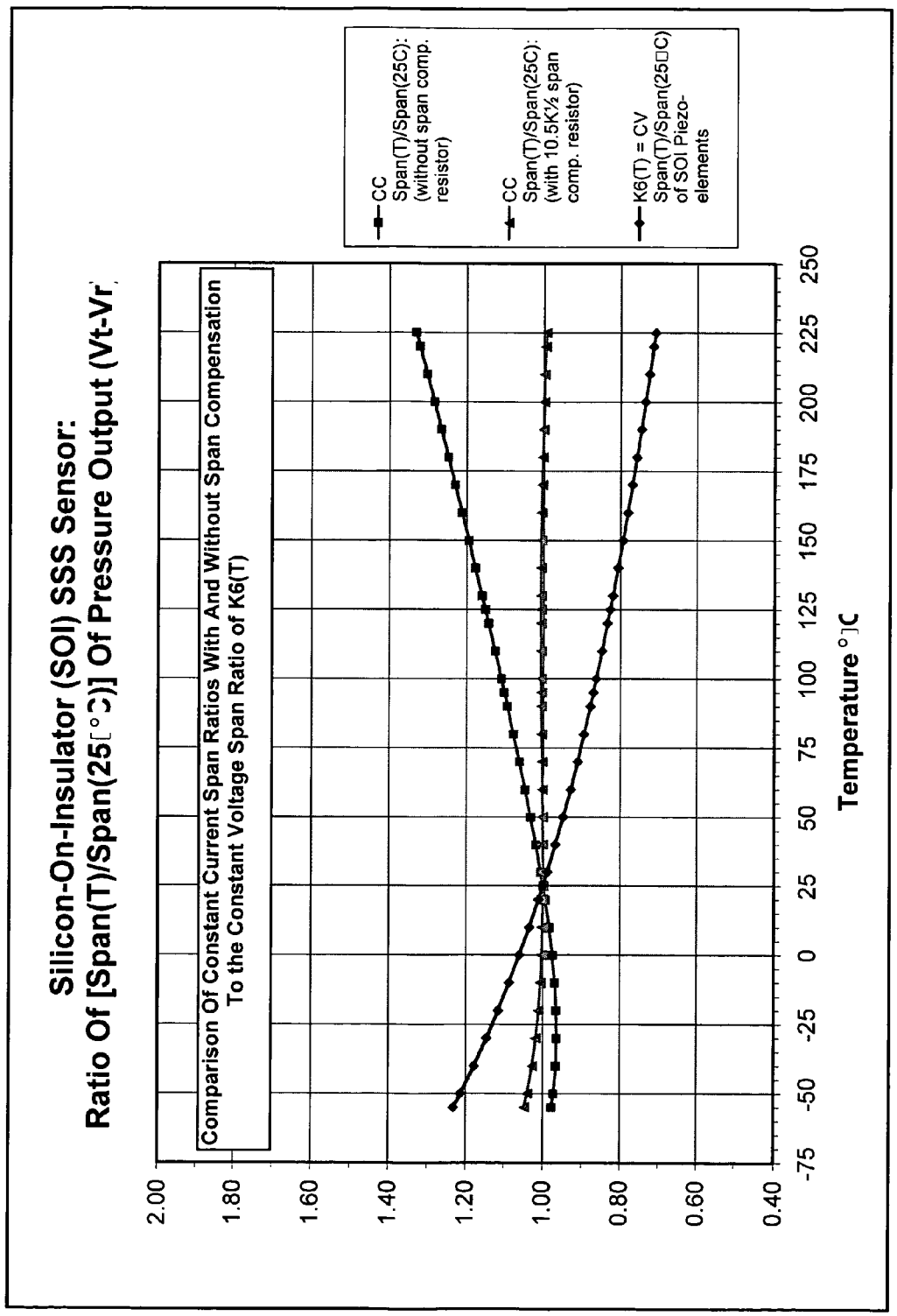
FIG. 10 illustrates an example plot of a CC span shift as a function of temperature with and without span compensation for the SOI silicon SSS sensor.

Equations (1)-(6) combined with the three polynomials K4(T), K5(T) and K6(T) can be used to generate a circuit model for the example of the single unit design as depicted and defined in FIG. 5A and Table 1 above. Example modeled ratios of the constant current Span(T)/Span(25° C.), with and without a compensation resistor, over the temperature range of −55° C. to +225° C. are plotted in FIG. 10. The CV span ratio as defined by the K6(T) uncompensated CC span shift increases to approximately +33% (ratio of 1.33), whereas the CC compensated span shift is within ±1.0% over the temperature range of −10° C. to +225° C. The span compensation includes placing a 10,500 ohm resistor, with a nominal zero TCR, in parallel with each sensing element (between pins 1 and 3 and between pins 2 and 4 as designated in the diagram of FIG. 1). The same compensation would be achieved by placing the 10,500 ohm resistor directly across the current source. For this configuration, the compensating resistor would be continuously powered rather than only powered when switched.

Figure 11:
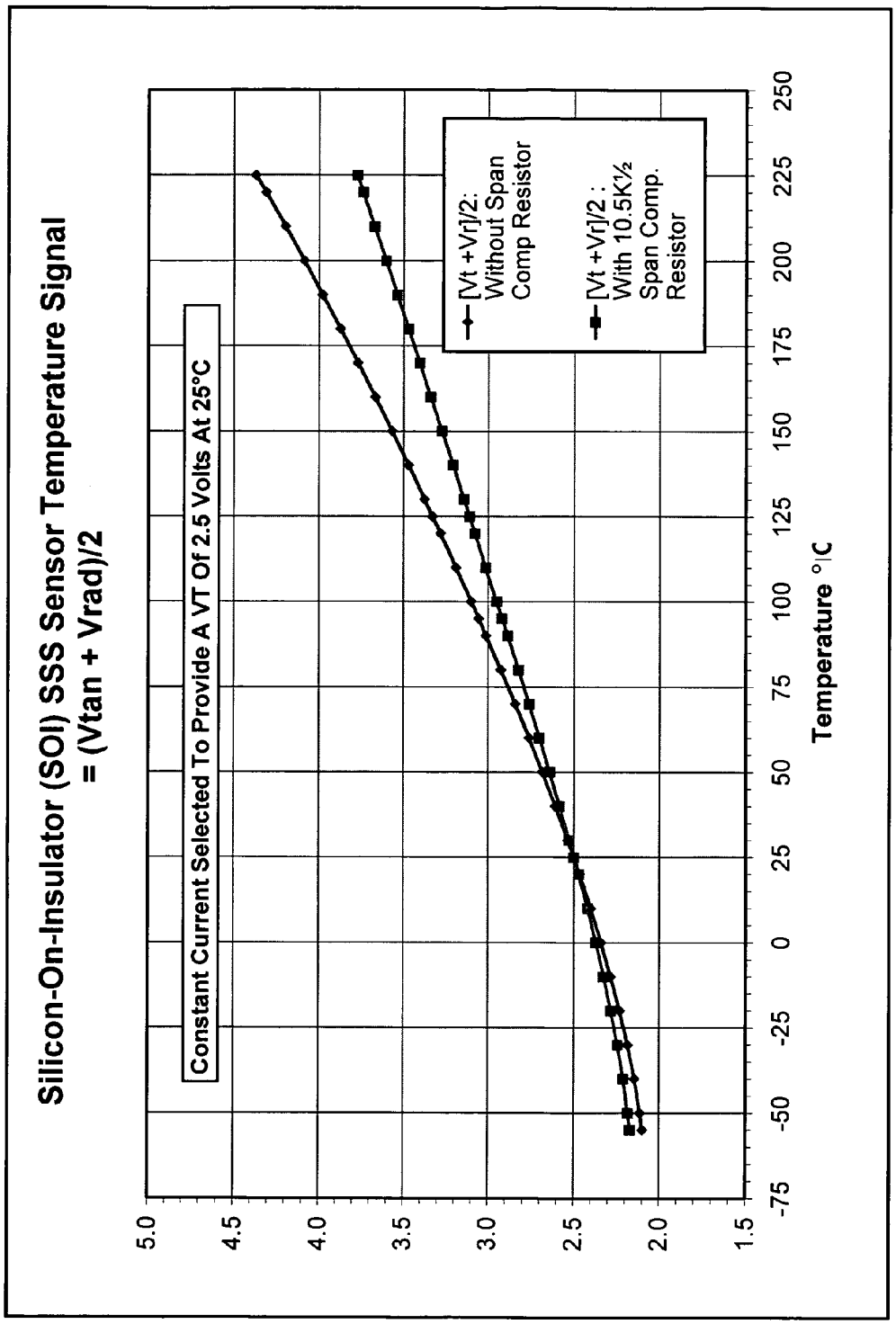
FIG. 11 illustrates an example plot of a temperature output as a function of temperature with and without span compensation for the SOI silicon SSS sensor.

This circuit model also provides output characteristics of the temperature signal VT, which is defined to be equal to (Vt+Vr)/2. FIG. 11 shows VT over the range of −55° C. to +225° C. for the two cases of "with" and "without" span compensation. The signal level is approximately 30% less for the "with" span compensation case. However, the signal sensitivity is about 6.3 mv/° C., which is slightly greater than a conventional full wheatstone bridge configuration operating with 5 volts excitation.

VI. Examples of the SSS sensor common cell

Figure 12A:
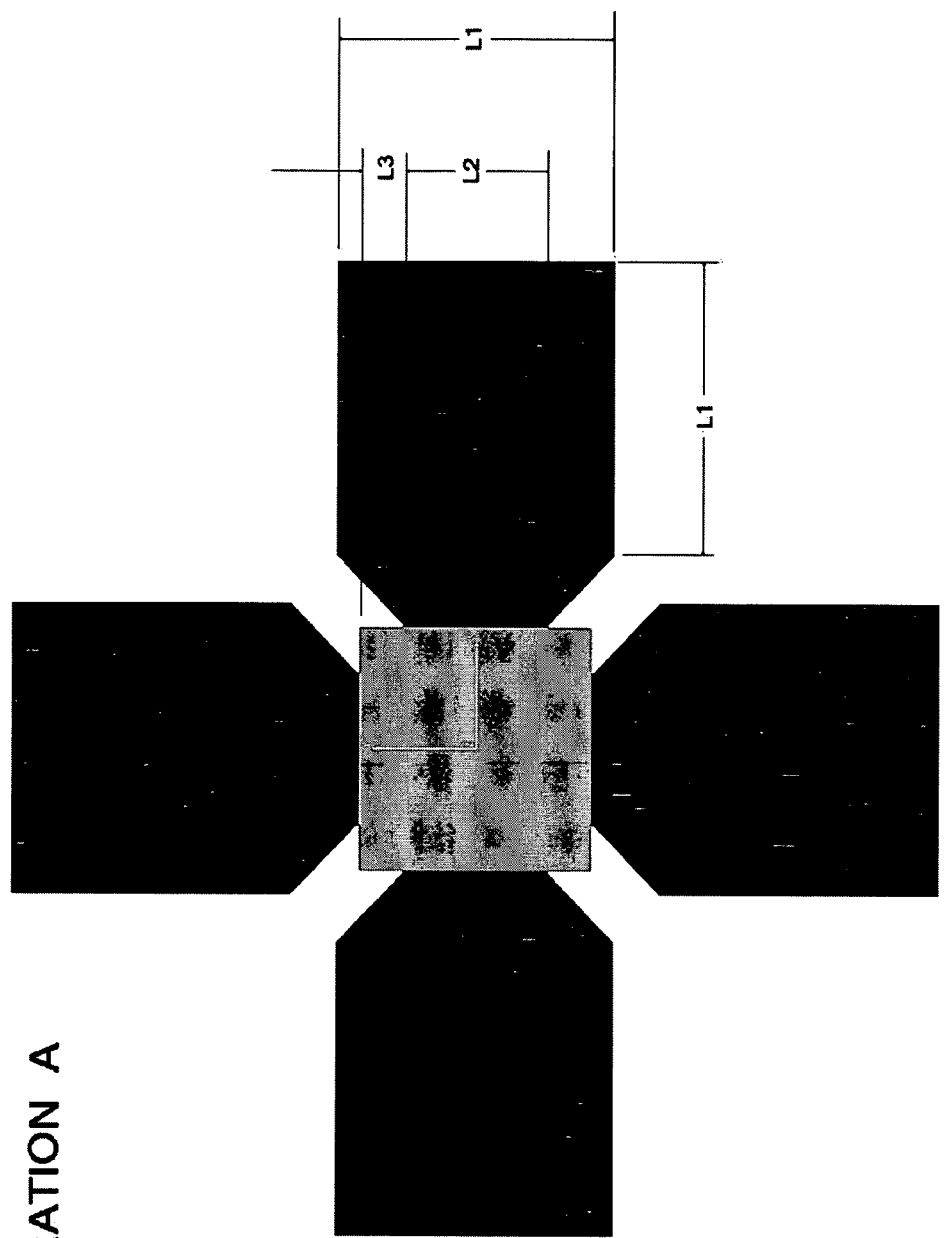
Figure 12B:
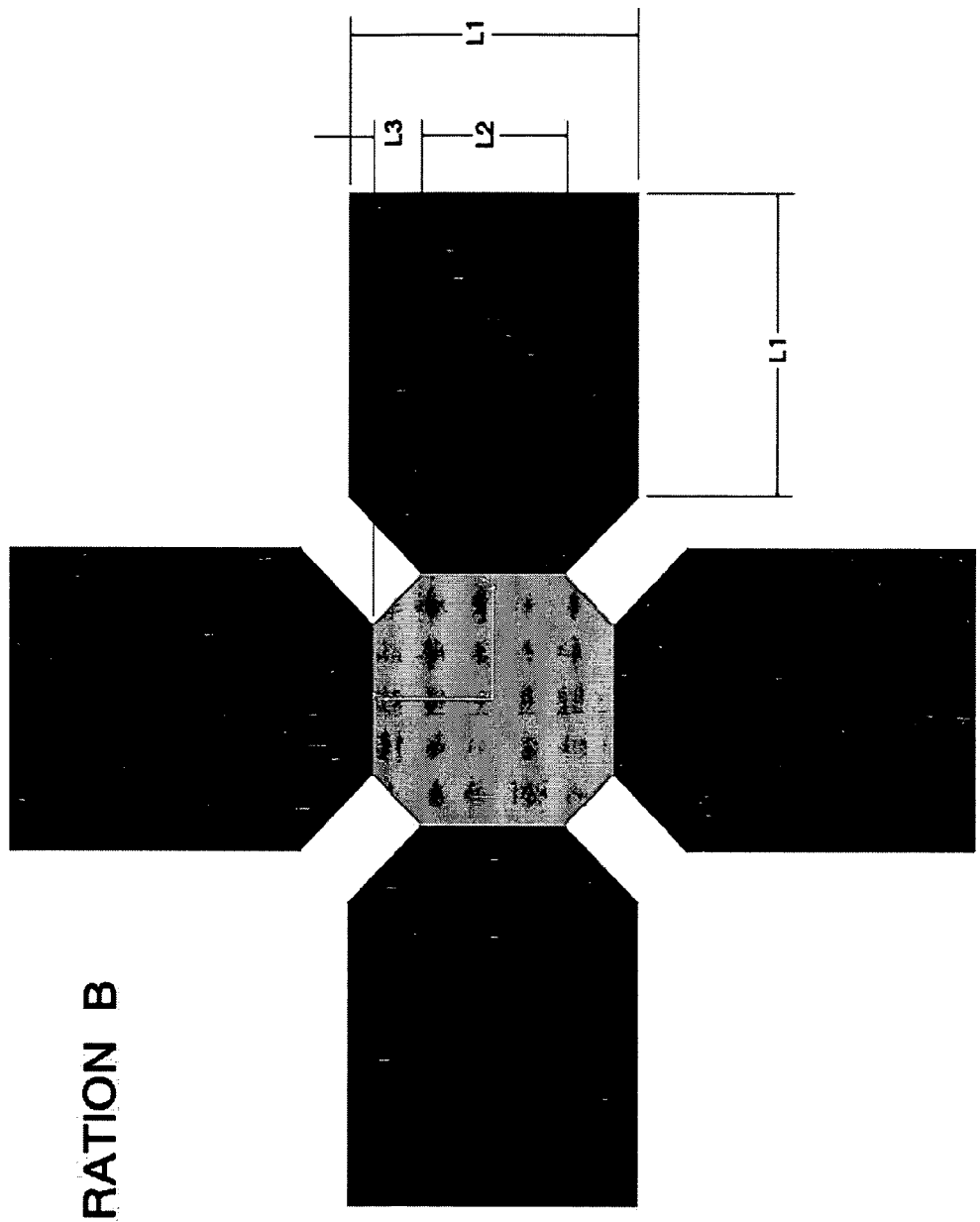

FIGS. 12A, 12B, and 12C illustrate three different variations of configuring the "light" implant resistance of the SSS sensor common cell, referred to herein as the "center resistance." Configuration A of FIG. 12A is a square feature. Configuration B of FIG. 12B is a square feature with a corner removed from each corner and each edge of the removed corner is equal to the L3 dimension. Configuration C of FIG. 12C is a square feature with a square removed from each corner and the dimension of the removed square is equal to the L3 dimension. For all cases, the L1 dimension equals 60 units and the L2 dimension equals 30 units.

Figure 13:
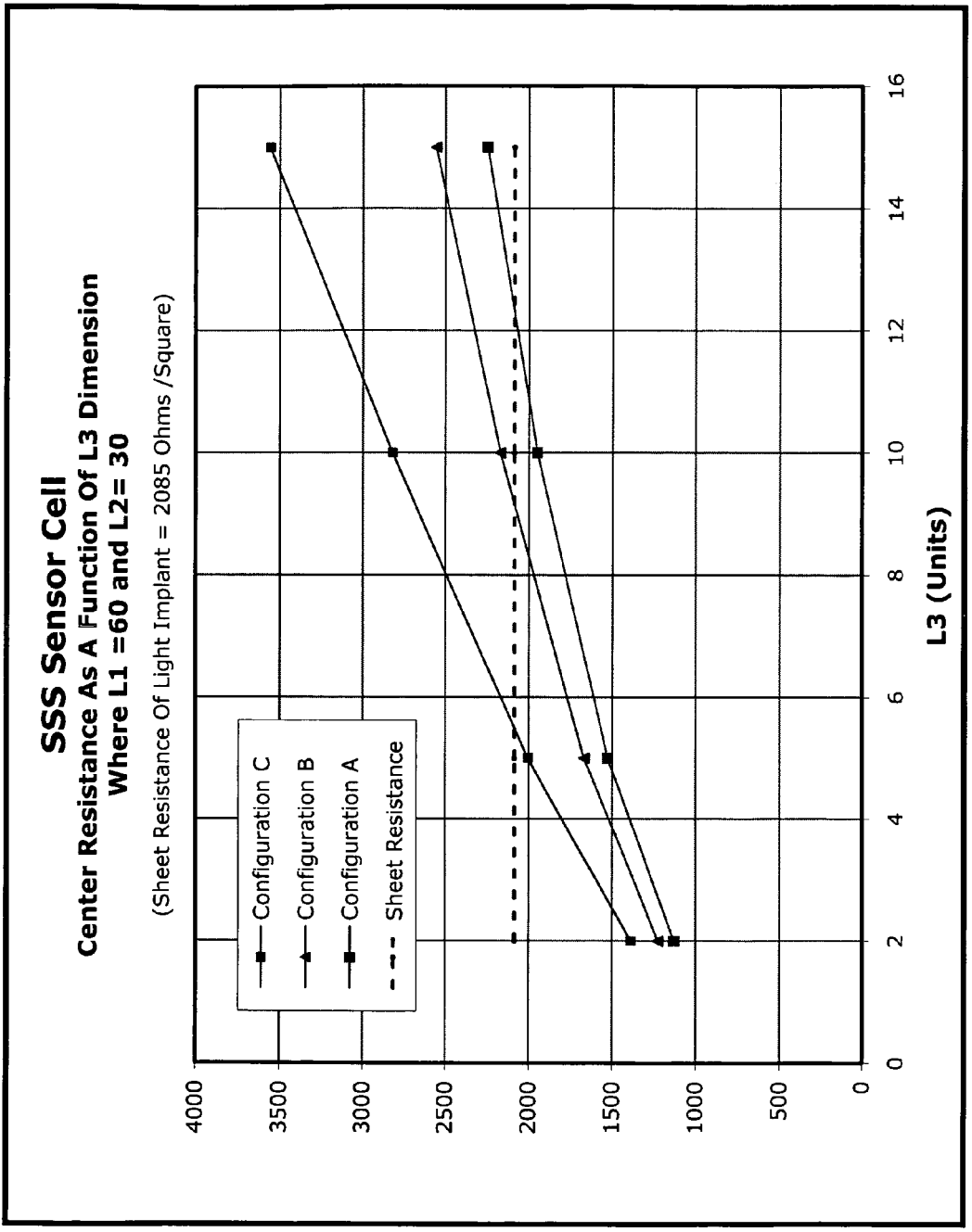
FIG. 13 is an example plot of a value of the center resistance as a function of a corner dimension for each of the three configurations in FIG. 12.

Finite element analysis (FEA) of the three configurations was performed for L3 unit values of 2, 5, 10, and 15 with an implant resistivity of the "heavy" leadout portion of the sensor cell at 120 ohms/square and the implant resistivity of the "light" center resistance portion of the sensor cell at 2,085 ohms/square. Plots illustrated in FIG. 13 show a value of the center resistance as a function of the L3 dimension for each of the three configurations. In some cases, for example, it may be desirable for layout purposes to have the center cell resistance equal in magnitude to the resistivity of the light implant (e.g., 2,085 ohm/square). As FIG. 13 illustrates, the center resistance of each configuration crosses the 2,085 ohm line at a different value of L3; approximately 12 for Configuration A, approximately 9 for Configuration B and approximately 5.5 for Configuration C. (Note that as L3 increases, the feature size of the SSS Sensor cell increases).

In all cases, the center resistance of the SSS Sensor cell increases with increasing values of L3, and current shunting effects decrease. FIG. 13 also illustrates that Configuration A achieves significantly higher center resistance values for the same L3 value compared to Configurations B and C. Therefore, for applications where a higher resistance is required, Configuration A would be preferred in that Configuration A provides the greater increase in center resistance for the smallest increase in feature size.

VII. Conclusion

The SSS sensor within many embodiments described herein can be used to reduce a complexity of typically Wheatstone bridge sensors, to increase pressure sensitivity and reduce on-chip voltage, which reduces average power usage, and to reduce thermal gradients between pressure and temperature measurements, for example.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A sensor comprising:
    a single sensing element having a tangential resistance when current flow is tangential to the sensing element and a radial resistance when current flow is radial to the sensing element,
    wherein when the sensing element is operated with a constant current source, a difference in the tangential resistance and the radial resistance is a measurement of pressure applied to the sensing element, and a sum of the tangential resistance and the radial resistance is a measurement of an ambient temperature of the sensing element.

2. The sensor of claim 1, wherein the single sensing element is configured as a square element.

3. The sensor of claim 1, wherein the single sensing element is configured as a square element with a triangular corner portion removed from each corner of the square element.

4. The sensor of claim 1, wherein the single sensing element is configured as a square element with a square portion removed from each corner of the square element.

5. The sensor of claim 1, wherein the sensing element is a piezo-resistive element.

6. The sensor of claim 1, further comprising a diaphragm, and wherein the single sensing element is implanted at an edge of the diaphragm.

7. The sensor of claim 1, wherein the single sensing element is a bulk silicon-based ion implanted sensor.

8. The sensor of claim 1, wherein the single sensing element is a silicon-on-insulator (SOI) based ion implanted sensor.

9. A sensing element comprising:
    a single square silicon element having a tangential resistance when current flow is tangential to the single square silicon element and a radial resistance when current flow is radial to the single square silicon element,
    wherein by changing a direction of current through the single square silicon element a tangential voltage across the tangential resistance and a radial voltage across the radial resistance can be measured to determine a magnitude of a pressure applied to the single square silicon element and to determine a magnitude of an ambient temperature of the single square silicon element.

10. The sensing element of claim 9, wherein the single square silicon element is a piezo-resistive element.

11. The sensing element of claim 9, wherein a difference between the tangential voltage and the radial voltage is proportional to the pressure applied to the single square silicon element.

12. The sensing element of claim 9, wherein a sum of the tangential voltage and the radial voltage is proportional to the ambient temperature of the single square silicon element.

13. The sensing element of claim 9, further comprising a diaphragm having a flexible membrane, and wherein the single square silicon element is implanted into the diaphragm.

14. The sensing element of claim 13, wherein pressures applied to the diaphragm cause deflections in the flexible membrane that cause a change the tangential voltage and the radial voltage.

15. The sensing element of claim 13, wherein the sensing element is implanted at an inner edge of the diaphragm.

16. The sensing element of claim 9, wherein the radial resistance includes a first and second leadout resistor and the tangential resistance includes a third and fourth leadout resistor, and wherein the first and second leadout resistor are in series with the radial direction across the single square silicon element and the third and fourth leadout resistor are in series with the tangential direction across the single square silicon element.

17. The sensing element of claim 16, wherein the first, second, third and fourth leadout resistors are heavy implant elements having low sheet resistivity (Rs) and low positive temperature coefficient of resistance (TCR).

18. The sensing element of claim 9, wherein the single square silicon element is a light implant element having a high sheet resistivity (Rs) and a high positive temperature coefficient of resistance (TCR).

19. A single square silicon (SSS) sensor comprising:
  a sensor chip including:
    a diaphragm having a flexible membrane, wherein pressures applied to the diaphragm cause deflections in the flexible membrane; and
    a single square silicon element having a tangential resistance when current flow is tangential to the sensing element and a radial resistance when current flow is radial to the sensing element,
  a current source coupled to the sensor chip and operable to provide current to the sensor chip, and wherein by changing a direction of current through the sensor chip a tangential voltage across the tangential resistance and a radial voltage across the radial resistance can be measured to determine a magnitude of a pressure applied to the single square silicon element and to determine a magnitude of an ambient temperature of the single square silicon element.

20. A method of measuring pressure and temperature using a common sensing element, the common sensing element having a tangential resistance when current flow is tangential to the common sensing element and a radial resistance when current flow is radial to the common sensing element, the method comprising:
  applying a current tangentially through the common sensing element;
  measuring a tangential voltage across the tangential resistance;
  applying a current radially through the common sensing element;
  measuring a radial voltage across the radial resistance;
  determining a magnitude of a pressure applied to the common sensing element and a magnitude of an ambient temperature of the common sensing element using the tangential voltage and the radial voltage; and
  storing the magnitude of the pressure applied to the common sensing element and the magnitude of the ambient temperature of the common sensing element.

21. The method of claim 20, determining the magnitude of the pressure applied to the common sensing element using the tangential voltage and the radial voltage comprises determining a difference between the tangential voltage and the radial voltage.

22. The method of claim 21, wherein the difference between the tangential voltage and the radial voltage is proportional to the pressure applied to the common sensing element.

23. The method of claim 20, wherein determining the magnitude of the ambient temperature of the common sensing element using the tangential voltage and the radial voltage comprises determining a sum of the tangential voltage and the radial voltage.

24. The method of claim 23, wherein the sum of the tangential and the radial voltage is proportional to the ambient temperature of the common sensing element.

* * * * *